Dec. 30, 1924.

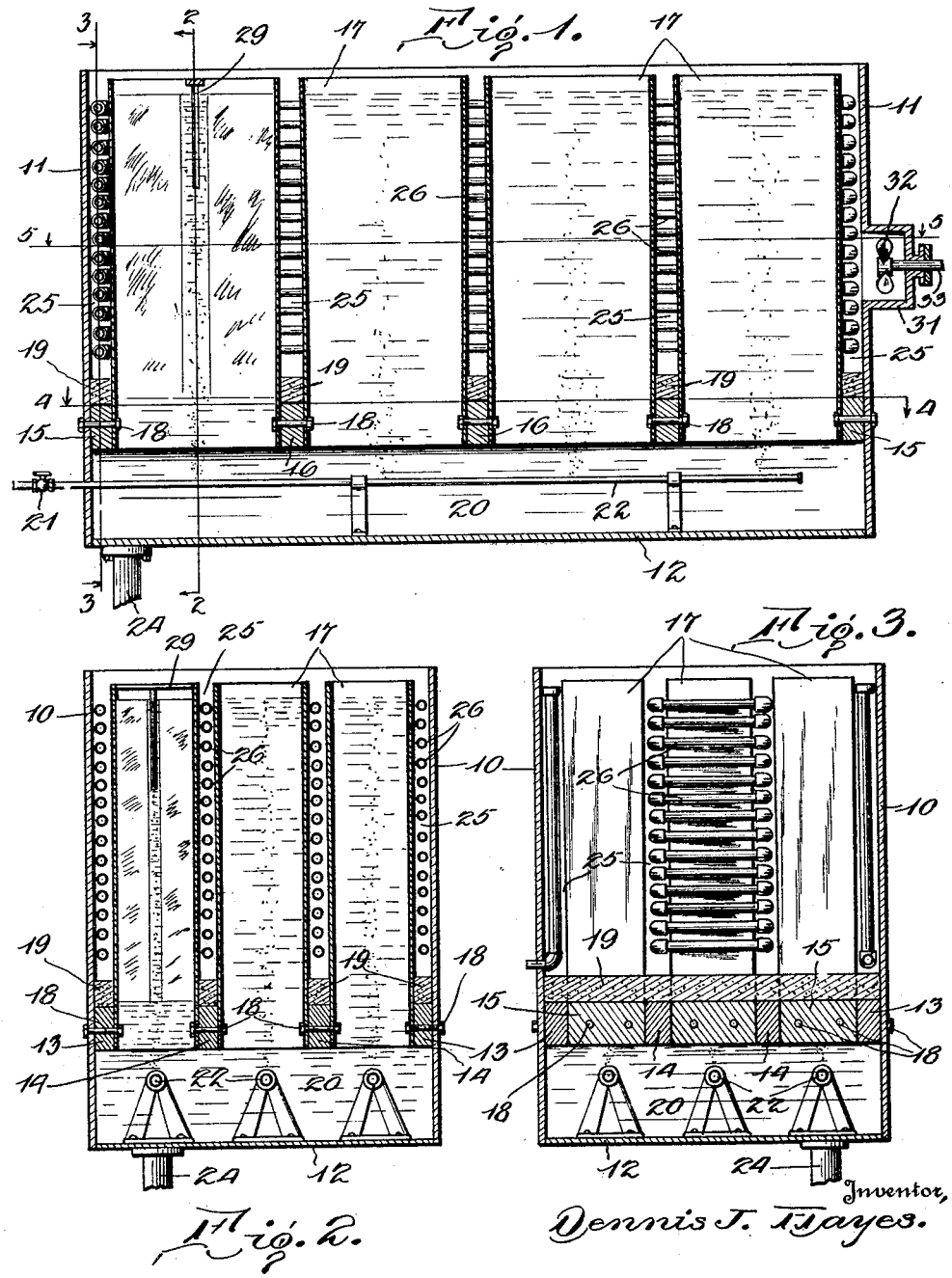

D. J. HAYES 1,521,445

REFRIGERATING APPARATUS

Filed June 13, 1923   2 Sheets-Sheet 2

Inventor,
Dennis J. Hayes.

By C. J. Stocksman
Attorney

Patented Dec. 30, 1924.

1,521,445

UNITED STATES PATENT OFFICE.

DENNIS J. HAYES, OF NEW ORLEANS, LOUISIANA.

REFRIGERATING APPARATUS.

Application filed June 13, 1923. Serial No. 645,086.

*To all whom it may concern:*

Be it known that I, DENNIS J. HAYES, a citizen of the United States, residing at New Orleans, in the parish of Orleans and State of Louisiana, have invented certain new and useful Improvements in Refrigerating Apparatus, of which the following is a specification.

This invention relates to refrigerating apparatus for the production of ice from raw water, and particularly to the construction of ice making tanks.

The primary object of my invention is the provision of an improved construction allowing the use of cans or moulds having no bottom.

Another object of my invention is to provide a suitable means of separating the water to be frozen from the freezing medium in a horizontal plane in such a manner that the water to be frozen will only freeze into ice at a certain distance below the freezing medium.

Another object is to provide for the use of cans or moulds without any bottom so as to have at all times a full size opening of said mould for the precipitation of any impurity that may be in the water to be frozen.

Another object is the provision of an improved tank construction by the use of suitable heavy wooden timbers supporting the lower ends of bottomless cans or moulds and capable of supporting the coils, weight of freezing medium, etc., thus making unnecessary the use of cans having special constructed bottoms and I am able to provide in a single tank, one compartment containing the brine and ammonia coils, and other compartments containing spaces for the ice to be frozen in; also a large heat-insulated non-freezing zone for the precipitation of any impurities.

Another object is the elimination of the necessity of any provision being made for the thawing of the ice from the bottom of cans or moulds.

Figure 4:
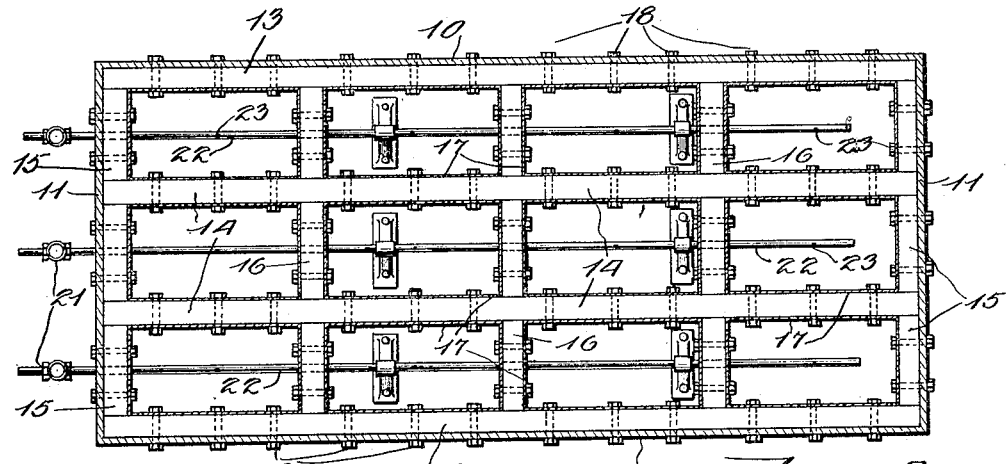
Figure 5:
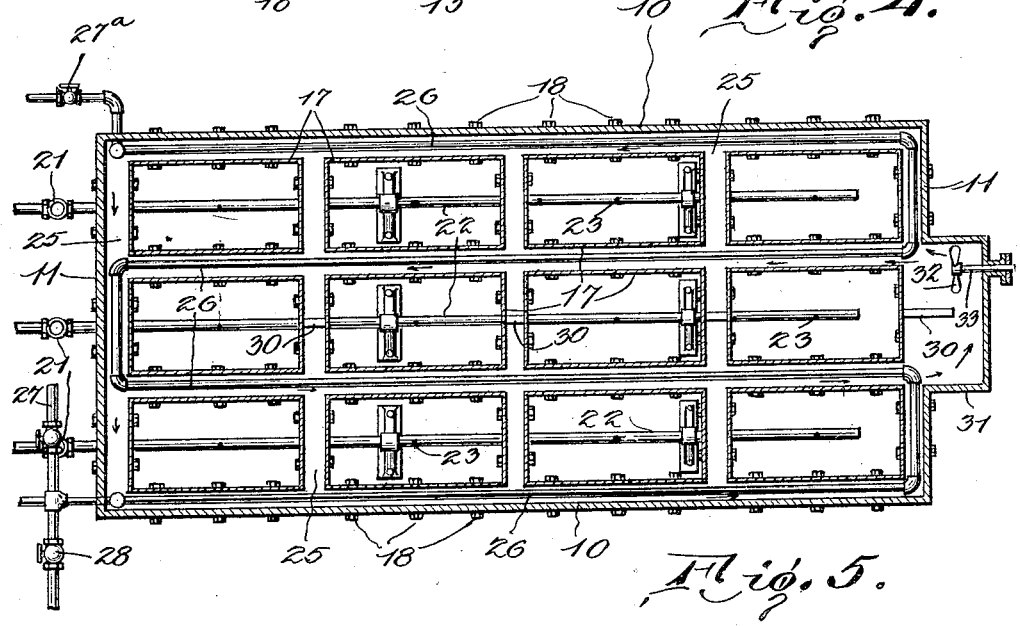

Referring to the drawing wherein I have illustrated a preferred embodiment of my invention, Figure 1 represents a vertical longitudinal cross section of my invention, Figure 2 is a vertical cross sectional view taken at right angles to the section of Figure 1 on the line 2—2 of Figure 1, Figure 3 is a vertical cross sectional view on the line 3—3 of Figure 1, Figure 4 is a cross section on the line 4—4 of Figure 1 and showing the timber supporting construction, Figure 5 is a cross section on the line 5—5 of Figure 1.

The same reference characters refer to similar parts throughout the figures of the drawing.

10 designates the side of the tank, 11 the ends and 12 the bottom thereof.

In my construction to be described, I have provided a brine space and a water space, the latter of which is separated from the former by members having a low coefficient of expansion. These members are preferably of a fibrous material and in the form shown, I have used wooden timbers. I have found that timbers 4 inches by 10 inches provide an excellent construction.

To the sides 10 are secured timbers 13 which preferably run the length of the tank. Parallel to the timbers 13 and spaced from each other and from the timbers 13 are timbers 14 similar in size to the timbers 13. These timbers are preferably spaced, from adjacent timbers, a distance equal to one outside dimension of the cans to be used.

At the ends 11 and between the timbers 13 and 14 and between the timbers 14, are other shorter timbers 15. Spaced at equal distances between the timbers 15 at opposite ends of the tank are timbers 16 similar in construction to the timbers 15.

Between adjacent sides of the timbers are the cans 17, open at their bottoms as will be later described. The cans 17 are secured to the timbers 13, 14, 15 and 16, respectively, by suitable bolts 18. These bolts 18 pass through the timber and the adjacent can walls and in the case of the cans having walls adjacent the walls of the tank, the bolts 18 pass through the walls of the tank and furnish a supporting means for the cans and the frame work of timbers.

The timbers 13, 14, 15 and 16 are suitably spaced above the bottom 12 of the tank. This space provides a reservoir and also permits the installation of the air pipe to be described.

During the construction of the tank, after the timbers and cans are in place, sealing material 19 in one or more layers, is run in between the outside walls of the cans and above the upper surfaces of the timbers. This effectively seals the chamber between the outer walls of the cans and the reservoir 20 which as already described is connected to the interior of the cans.

A suitable air inlet 21, provides a supply of air for the air agitator pipes 22 which extend beneath the center of each row of cans. Beneath the center, of each of the cans, is an opening 23, in the pipe 22, for providing agitation for the raw water. When raw water is used for freezing purposes, this agitation caused by the rising of the bubbles from the openings 23, causes the impurities to be left in the unfrozen water as the freezing takes place.

A suitable water inlet and outlet 24, connected to the water main, is provided as shown in Figure 1.

Above the sealing compound 19 and between the outer walls of the adjacent cans is the brine space 25. Suspended in this brine space 25 are the cooling pipes 26. A pipe 27 leads to the ammonia supply and a connection 27$^a$ leads to the vacuum pipe. A pipe 28 leads to a source of hot gas supply. The ammonia connection is used during the freezing operation and the hot gas connection is used to warm the brine and the walls of the cans when the freezing operation is complete. This permits the ice to be easily withdrawn by means of the lifting rod 29 which is frozen in the ice.

I have provided partitions 30 to separate the brine space, except at the ends, into two sections. In an enlarged portion 31 of the tank, I have provided a propelling member 32 mounted on a shaft 33 which is driven in any suitable manner. When the propeller is put in motion, the brine is kept in circulation as indicated by the arrows, thus keeping the whole body of the brine at the same temperature.

From the above description, it is clear that I have provided a simple, efficient and cheap construction and one which will not be affected, by the temperature, to cause leaks; also eliminates the necessity of constructing cans or moulds with bottoms. Also providing a large sediment chamber for the precipitation of any impurities, and, at the same time creating a non-freezing zone, beyond which the ice will not freeze.

While I have shown and described in detail an embodiment of my invention, I desire to have it understood that I do not limit myself to the exact form shown and that modifications and changes may be made without departing from the spirit of my invention and within the scope of the appended claims.

Having described my invention, what I claim is:—

1. An ice making apparatus comprising a tank, the tank having a brine compartment, a raw water compartment and ice compartments within the brine compartments and so arranged that the brine surrounds all of the sides of the ice compartments, the ice compartments being always in free communication through substantially their full bottoms with the water compartment, a heat insulating means adjacent the bottom of the brine compartment and surrounding the ice compartment adjacent the lower end thereof.

2. An ice making apparatus comprising a tank, the tank having a brine compartment, a raw water compartment and ice compartments, the ice compartments having substantially their whole bottoms open to the raw water compartment and having all of their sides surrounded by the brine of the brine compartment, the raw water compartment extending substantially throughout the area of the bottom of the tank, and heat insulating material adjacent the bottom of the brine compartment and surrounding the ice compartments adjacent their bottoms.

3. An ice making apparatus comprising a tank, the tank having a brine compartment, a raw water compartment and ice compartments, the brine compartments surrounding the sides of the ice compartments and being separated from the water compartments by wooden timbers, bolts passing through the timbers and the adjacent walls of the ice compartments and outside walls of the tank, and a sealing compound on the timbers at the bottom of the brine compartment.

In testimony whereof I affix my signature.

DENNIS J. HAYES.